J. W. LAMBERT.
TRACTOR.
APPLICATION FILED APR. 19, 1919.
1,423,227.
Patented July 18, 1922.
2 SHEETS—SHEET 1.
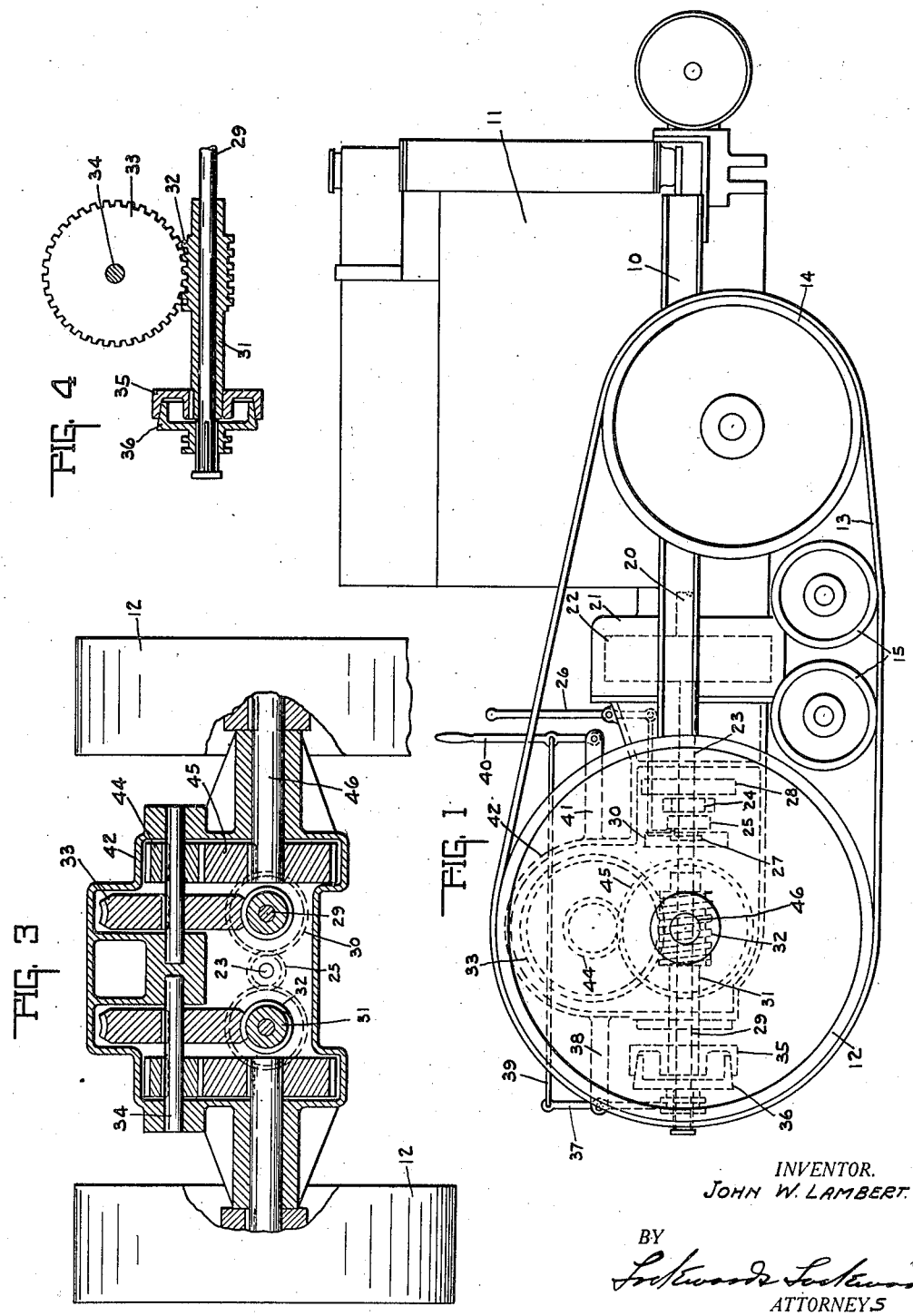
INVENTOR.
JOHN W. LAMBERT.
BY
*Lockwood Lockwood*
ATTORNEYS

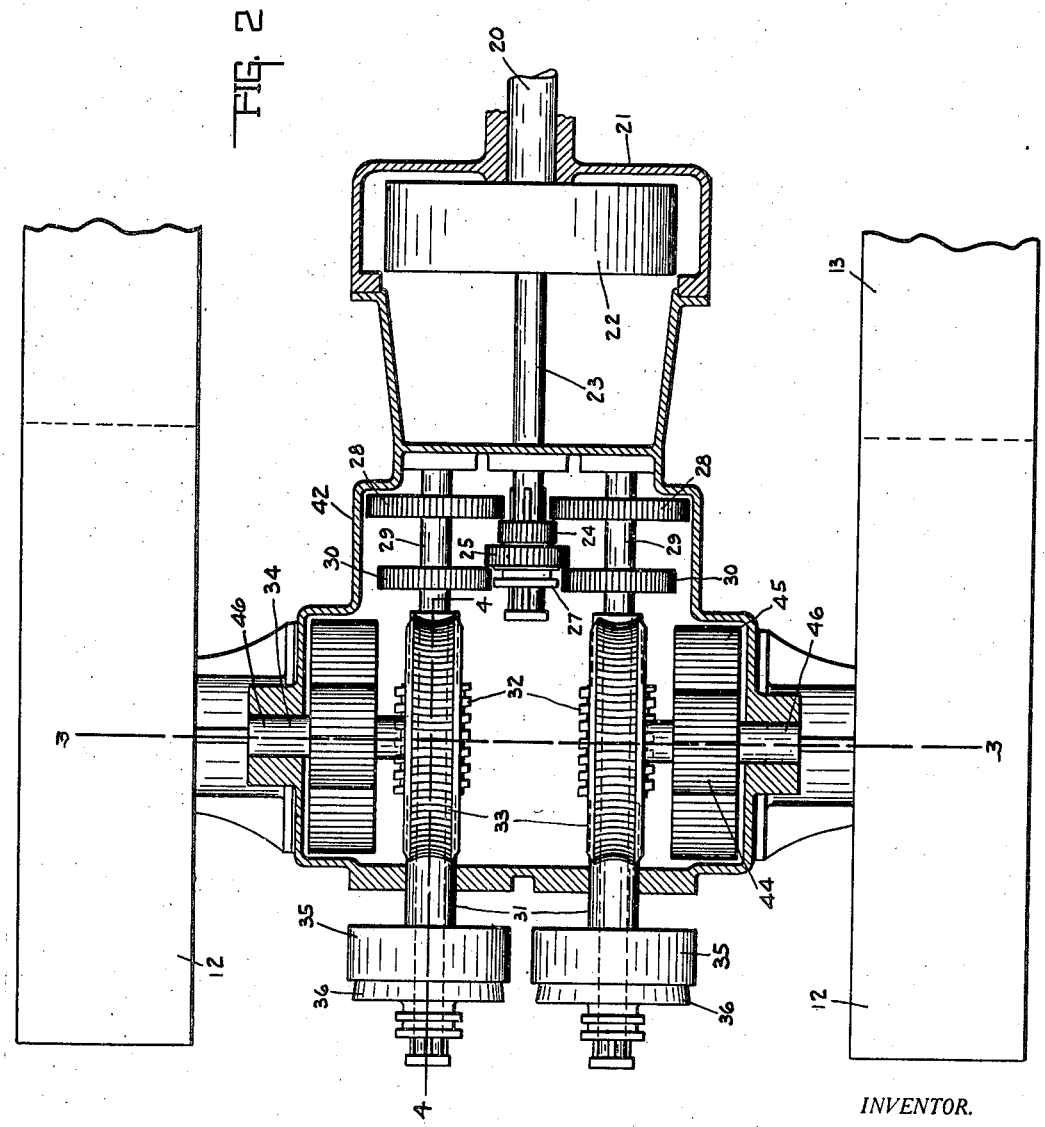

UNITED STATES PATENT OFFICE.

JOHN W. LAMBERT, OF ANDERSON, INDIANA.

TRACTOR.

1,423,227.	Specification of Letters Patent.	Patented July 18, 1922.

Application filed April 19, 1919. Serial No. 291,291.

*To all whom it may concern:*

Be it known that I, John W. Lambert, a citizen of the United States, and a resident of Anderson, county of Madison, and State of Indiana, have invented a certain new and useful Tractor; and I do hereby declare that the following is a full, clear, and exact description thereof, reference being had to the accompanying drawings, in which like numerals refer to like parts.

The object of this invention is to improve driving or power transmission mechanism of tractors of the caterpillar or chain tread type. One of the practical difficulties in the construction and operation of such tractors is a satisfactory reduction of speed from the motor to the driving wheels of the tractor, which must travel relatively slowly.

One feature of the invention consists in the construction which enables the use of a worm drive for propelling the axle of each of the main driving wheels of the tractor and yet which permits the steering of the tractor by operating one of the side wheels while not operating or driving the other side wheel.

The full nature of this invention will be understood from the accompanying drawings and the following description and claims:

In the drawings Fig. 1 is a side elevation of said tractor, parts being shown in outline. Fig. 2 is a plan view of the rear portion of the tractor in horizontal section, showing parts in plan view and parts broken away. Fig. 3 is a vertical section on line 3—3 of Fig. 2, showing parts of the device. Fig. 4 is a section through a part of the machine on line 4—4 of Fig. 2.

Most of the portions of the tractor shown in Fig. 1 are familiar to those skilled in the art and constitute no new feature of this invention and therefore will not be described in detail.

The frame 10 carries an engine or motor 11 and the drive side wheels 12 support the rear part of the frame and propel the machine, operating upon a chain tread 13, and there being front wheels 14 and intermediate wheels 15 also operating on said chain tread, at each side of the machine.

Referring to the portions of the machine which are more closely related to the invention herein, as seen in Fig. 2, there is an engine shaft 20 mounted in the frame 21 and carrying a fly wheel 22, which drives the shaft 23, extending rearwardly and centrally of the machine and splined to receive the sliding gears 24 and 25 which are moved on shaft 23 in either direction by means of the lever mechanism 26, engaging the collar 27 associated with said gears. These gears 24 and 25 are shown in idle position in Fig. 2 but if moved forward the gear 24 will move between and simultaneously mesh with and drive the gears 28 on counter-shafts 29, and if the gears 24 and 25 are moved rearwardly the gear 24 will be brought into mesh with both gears 30, also mounted rigidly on the shafts 29, and simultaneously drive them. There are two of the shafts 29 parallel with each other, one to drive each main side wheel 12. Each shaft 29, as seen in Fig. 4, extends through a sleeve 31, which has on it a worm 32 that meshes with the worm wheel 33 on the axle 34. The sleeve 31 is coupled or clutched with the shaft 29 by friction clutch mechanism shown in Fig. 4, wherein there is one clutch member 35 secured to the sleeve 31 and another clutch member 36 splined on the shaft 29 and slidable into clutching engagement by lever 37 (see Fig. 1) which engages the collar 38. The lever 37 is fulcrumed on the arm 38 operated by a link or rod 39 running to the hand lever 40 fulcrumed on the arm 41 on the housing 42. As seen in Fig. 3, the shaft 34 for each worm wheel 33 is mounted in said housing and carries a pinion 44, which meshes with the gear 45 on the axle 46 of the main side wheel 12 of the tractor. Consequently there is a great reduction of speed of rotations as one passes through the foregoing transmission mechanism from the engine shaft to the main side wheel axle 46.

In operation the whole machine can be thrown out of gear by moving the hand lever 26 to bring the gears 24 and 25 into idle position as shown in Fig. 2. By shifting said gears in the forward direction the gears 28 will be driven and the tractor propelled at a relatively slow speed. If the gears 30 are driven the tractor will be propelled at a more rapid speed. Consequently this driving mechanism is provided with two speeds, slow and fast. In either event the power will be transmitted through the worm 32 and worm wheel 33 to the side wheels of the tractor for propelling the same, and this enables a very compact construction for accomplishing the objects intended.

To cause the tractor to turn to the right while traveling, the right-hand clutch member 36 is released so that only the left-hand wheel 12 is propelled. By releasing instead the left-hand clutch member 36 the machine will be steered in the opposite direction. It is to be understood that there are two hand levers 40 and associated mechanisms, one for each clutch member 36.

The invention claimed is:

1. In a tractor the combination with parallel ground-engaging traction devices, and a motor driven primary transmission shaft intermediate said devices, of parallel secondary transmission shafts, similar gear means upon each of said secondary shafts, driving gear means upon said transmission shaft and rotatable thereby, said means being slidable longitudinally on said transmission shaft into simultaneous engagement with both of said gear means on said secondary transmission shafts for driving both of said shafts at variable speeds, gear means rotatably mounted on said secondary shafts, independent clutch means connecting each of said last mentioned gear means to the respective secondary shafts upon which they are mounted, a divided jack shaft, a plurality of gear means secured one to each section of said jack shaft and operatively associated with one of the second mentioned gear means upon said secondary transmission shafts, and independent transmission devices connecting the sections of said jack shaft one to each of said ground-engaging traction devices.

2. In a tractor, the combination with laterally spaced ground-engaging traction devices and a motor driven primary transmission shaft, of laterally spaced secondary transmission shafts, means for simultaneously driving said secondary shaft from said primary shaft, transmission worms loosely mounted on said secondary shafts, independent clutches for connecting said worms to the respective secondary shafts on which they are mounted, a divided jack shaft, worm gears secured, one to each section of said jack shaft and meshing, one with each of said worms, and independent transmission devices connecting the sections of said jack shaft, one to each of said ground-engaging traction devices.

In witness whereof, I have hereunto affixed my signature.

JOHN W. LAMBERT.